(12) United States Patent
Moran et al.

(10) Patent No.: US 7,383,330 B2
(45) Date of Patent: Jun. 3, 2008

(54) METHOD FOR MAPPING A NETWORK FABRIC

(75) Inventors: John M Moran, Mebane, NC (US); Eric R Vook, Durham, NC (US); Michael Burriss, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 700 days.

(21) Appl. No.: 10/155,299

(22) Filed: May 24, 2002

(65) Prior Publication Data

US 2003/0221001 A1 Nov. 27, 2003

(51) Int. Cl.
*G06F 15/173* (2006.01)
(52) U.S. Cl. .................. 709/223; 709/224; 709/203
(58) Field of Classification Search .............. 709/224, 709/203, 223
See application file for complete search history.

(56) References Cited

U.S. PATENT DOCUMENTS

| | | | | |
|---|---|---|---|---|
| 5,870,538 A * | 2/1999 | Manning et al. ............... 714/42 |
| 6,262,976 B1 * | 7/2001 | McNamara ................... 370/254 |
| 6,401,128 B1 * | 6/2002 | Stai et al. ..................... 709/236 |
| 6,421,711 B1 * | 7/2002 | Blumenau et al. ........... 709/213 |
| 6,532,212 B1 * | 3/2003 | Soloway et al. ............. 370/230 |
| 6,606,690 B2 * | 8/2003 | Padovano ..................... 711/148 |
| 6,628,623 B1 * | 9/2003 | Noy ............................. 370/255 |
| 6,728,789 B2 * | 4/2004 | Odenwald et al. ............... 710/3 |
| 6,751,702 B1 * | 6/2004 | Hsieh et al. .................. 711/112 |
| 6,754,718 B1 * | 6/2004 | Dobberpuhl et al. ........ 709/250 |
| 6,779,083 B2 * | 8/2004 | Ito et al. ....................... 711/114 |
| 6,907,457 B2 * | 6/2005 | Merrell et al. ............... 709/223 |
| 6,917,988 B1 * | 7/2005 | Allen et al. ..................... 710/1 |
| 6,920,494 B2 * | 7/2005 | Heitman et al. ............. 709/223 |
| 2003/0023705 A1 * | 1/2003 | Kim ............................. 709/220 |
| 2003/0065821 A1 * | 4/2003 | Lee .............................. 709/249 |
| 2003/0072312 A1 * | 4/2003 | Alasti et al. .............. 370/395.4 |
| 2003/0076788 A1 * | 4/2003 | Grabauskas et al. ........ 370/254 |
| 2003/0118013 A1 * | 6/2003 | Steele et al. ................. 370/388 |
| 2003/0120852 A1 * | 6/2003 | McConnell et al. ......... 710/316 |
| 2003/0135609 A1 * | 7/2003 | Carlson et al. .............. 709/224 |
| 2003/0202520 A1 * | 10/2003 | Witkowski et al. ......... 370/400 |
| 2003/0204618 A1 * | 10/2003 | Foster et al. ................. 709/238 |

* cited by examiner

*Primary Examiner*—Kenny Lin
*Assistant Examiner*—Lan-Dai T Truong
(74) *Attorney, Agent, or Firm*—Ward and Smith, P.A.; A. Jose Cortina; R. Kevin Perkins, Esq.

(57) ABSTRACT

In accordance with a method and system described herein, in order to map the physical location and connections between all of the components of a network from the perspective of a particular host, i.e., discover the fabric of the network, and the hierarchical relationship between storage disk array components including chassis IDs, storage processors, and storage processor ports, queries are generated and sent to the different operating systems or software that are implemented on the components, i.e., hardware devices of the network. These queries ask the device what it sees. Starting with identifiable starting points and ending points in the fabric, the host selectively queries components within the fabric. Using the query data the host applies a series of comparison and process of eliminations steps, in order to complete a table of the components and connections that comprise the network fabric.

12 Claims, 3 Drawing Sheets

METHOD FOR MAPPING A NETWORK FABRIC

BACKGROUND OF THE INVENTION

1. Field of the Invention

There is disclosed herein a method for mapping a network fabric. More specifically, the method discussed herein uses query data to physically map the fabric of a network

2. Description of the Background

As fibre channel networks grow and the number of components and I/O ports comprising the network fabric increases, visual inspection is no longer a viable option for mapping the components and connections of the network fabric. The ability to have a map of the network fabric is crucial to testing and maintaining the network and to maximizing efficient use of the network components.

Consequently, there is a need in the art for a method for mapping a network fabric without the need for visual inspection of the fabric.

SUMMARY OF THE INVENTION

A tool for building an in-memory picture of a fibre channel fabric using information that is available from the devices in the fabric. The tool works by requesting information from each device that the user has specified as part of the fabric and creating a representation of the topology based on the responses.

In accordance with a first embodiment of the present invention, there is described herein a method for mapping the components and connections of a network fabric. The method includes identifying the components of the network fabric, at least one starting port of the network fabric, and at least one ending port of the network fabric. Further to this first embodiment the method includes querying the components of the network fabric in order to determine the connections between the components of the network fabric and mapping the components of the network fabric and all connections between the at least one starting point and the at least one ending point of the network fabric.

In accordance with a second embodiment of the present invention, there is described herein a method for mapping a network fabric, wherein the network fabric includes at least one disk storage unit, at least one switch, and a host. Further to the second embodiment, the method identifies at least one starting port of the network fabric at the host, at least one ending port of the network fabric at the at least one disk storage unit, and at least two middle ports of the network fabric at the at least one switch. The method recognizes the existence of multiple disks at the end of the network fabric and queries the at least one disk storage unit, at least one switch, the host, and the multiple disks of the network fabric in order to determine the connections therebetween. The method maps the at least one disk storage unit, at least one switch, the host, and the multiple disks of the network fabric and all connections therebetween.

In accordance with a third embodiment of the present invention, there is described herein a process for mapping a network fabric. The process includes generating a list of switch names, including the corresponding network address for each switch name; querying a network fabric using the corresponding network address for each switch name to determine the existence of one or more switches from the list of switch names; selecting a first switch from the one or more switches; requesting from the first switch, a list of first ports and an identifying number associated with each of the first ports; and requesting from the first switch an identifying number for the first switch, for each of a list of second ports, and for each of a list of third ports.

BRIEF DESCRIPTION OF THE DRAWINGS

Having thus briefly described the invention, the same will become better understood from the following detailed discussion made with reference to the drawings in which.

DETAILED DESCRIPTION OF THE PREFERRED EMBODIMENTS OF THE PRESENT INVENTION

Figure 1:
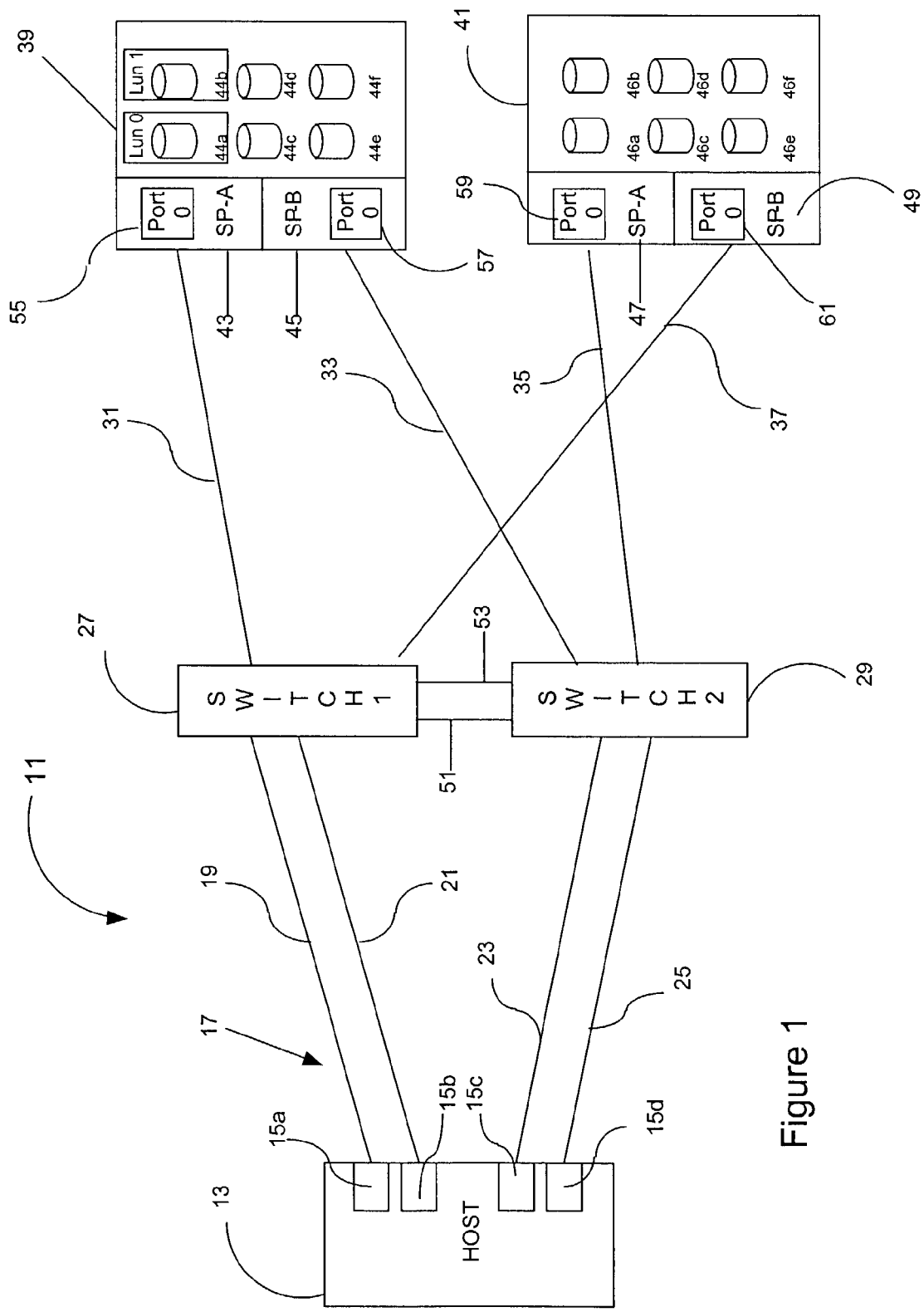
FIG. 1 is a block diagram illustrating a network configuration.

FIG. 1 illustrates an example of a typical network configuration, the fabric of which can be mapped using the system and method of the present invention. The network 11 includes a host 13 which can be a server such as from Sun Microsystems, or other type of conventional server running an operating system such as Windows, DGUX, etc. The server 13 includes a plurality of host bus adaptors (HBAs) 15a-15d which are connected through a fibre channel 17 including paths 19, 21, 23 and 25 through switches 27 and 29 to a plurality of storage disk arrays. In this case, for the sake of simplicity the system is illustrated as having only two storage disk arrays 39 and 41. The switches establish fibre channel paths 31, 33, 35 and 37 to the storage disk arrays 39 and 41 each of which are controlled respectively by storage processors SP-A and SP-B identified by the numbers 43, 45, 47 and 49 through storage processor ports 55, 57, 59, and 61. The storage disk arrays 39 and 41 include a number of LUNs, 44a-44f, 46a-46f, which are logical constructs built upon non-volatile memory drives, and the operation thereof is controlled by the storage processors SP-A and SP-B, respectively for each storage disk array 39 and 41 in a manner well known to those of ordinary skill in the art. The switches also establish fibre channel paths 51 and 53 to each other, thereby allowing both switches to operate as one network fabric. The network configuration of FIG. 1 is merely exemplary. One skilled in the art recognizes the many components which may be added, deleted, and rearranged within the network in response to the specific input and output characteristics desired by the users of the network. Further, one skilled in the art recognizes that each of the components illustrated in FIG. 1 may in fact include numerous other connections to other hosts, etc. that are not intended to be included in the fabric of the network of host 13 for mapping purposes in the embodiment described herein.

In accordance with a method and system of the current invention, in order to map the physical location and connections between all of the components of a network from the perspective of a particular host, i.e., discover the fabric of the network, and the hierarchical relationship between storage disk array components including chassis IDs, storage processors, and storage processor ports, queries are generated and sent to the different operating systems or software that are implemented on the components, i.e., hardware devices of the network. These queries ask the device what it sees. Starting with identifiable starting points and ending points in the fabric, the host selectively queries components within the fabric. Using the query data, the host applies a series of comparison, inference, and process of eliminations steps in order to complete a table of the components, the connections, and the hierarchical relationship between storage disk array components including chassis IDs, storage processors, and storage processor ports that comprise the network fabric.

Figure 2A:
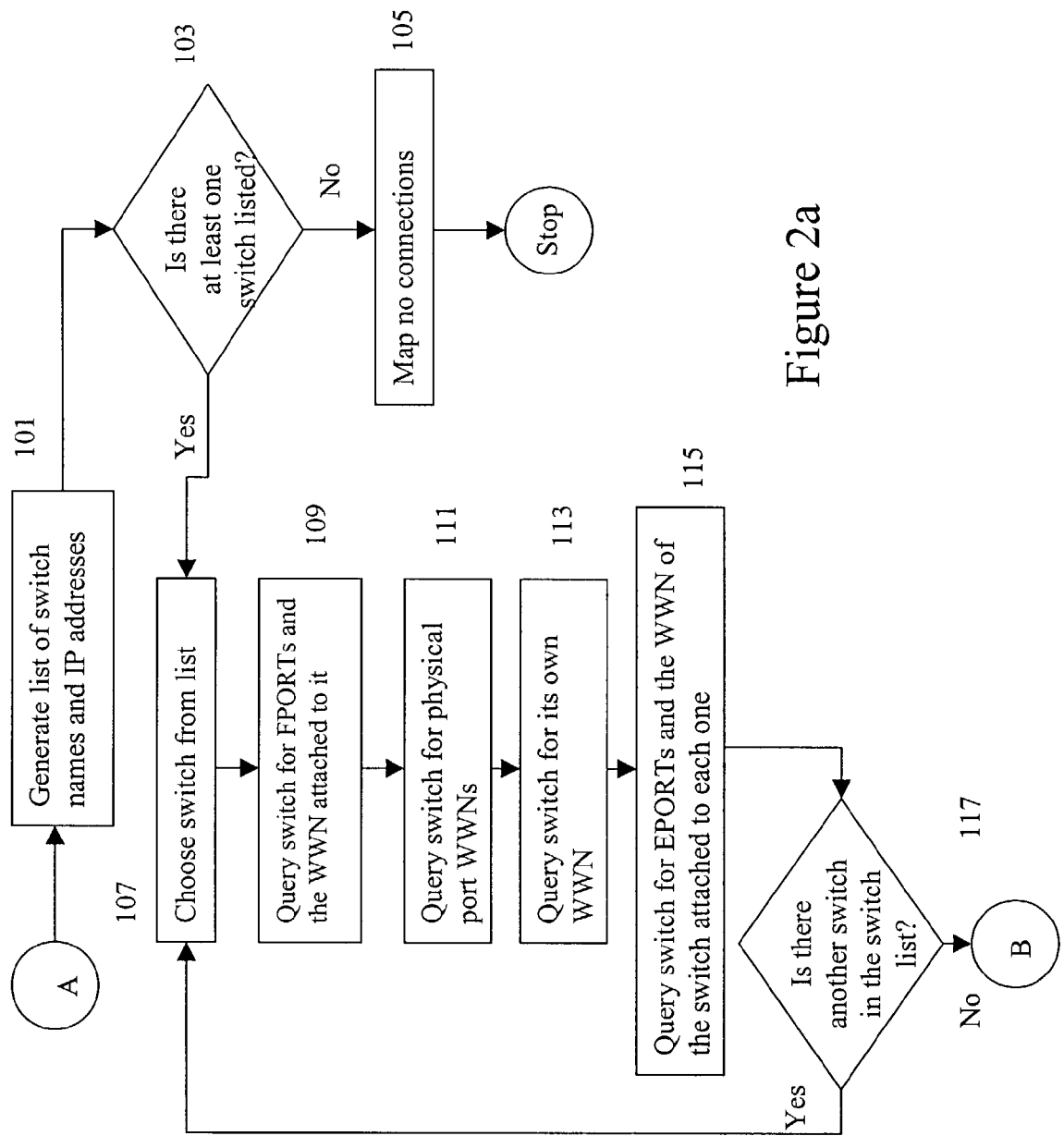
FIGS. 2a-2b are flow diagrams illustrating a method for mapping a fabric network, such as that shown in FIG. 1, according to an embodiment of the present invention.
Figure 2B:
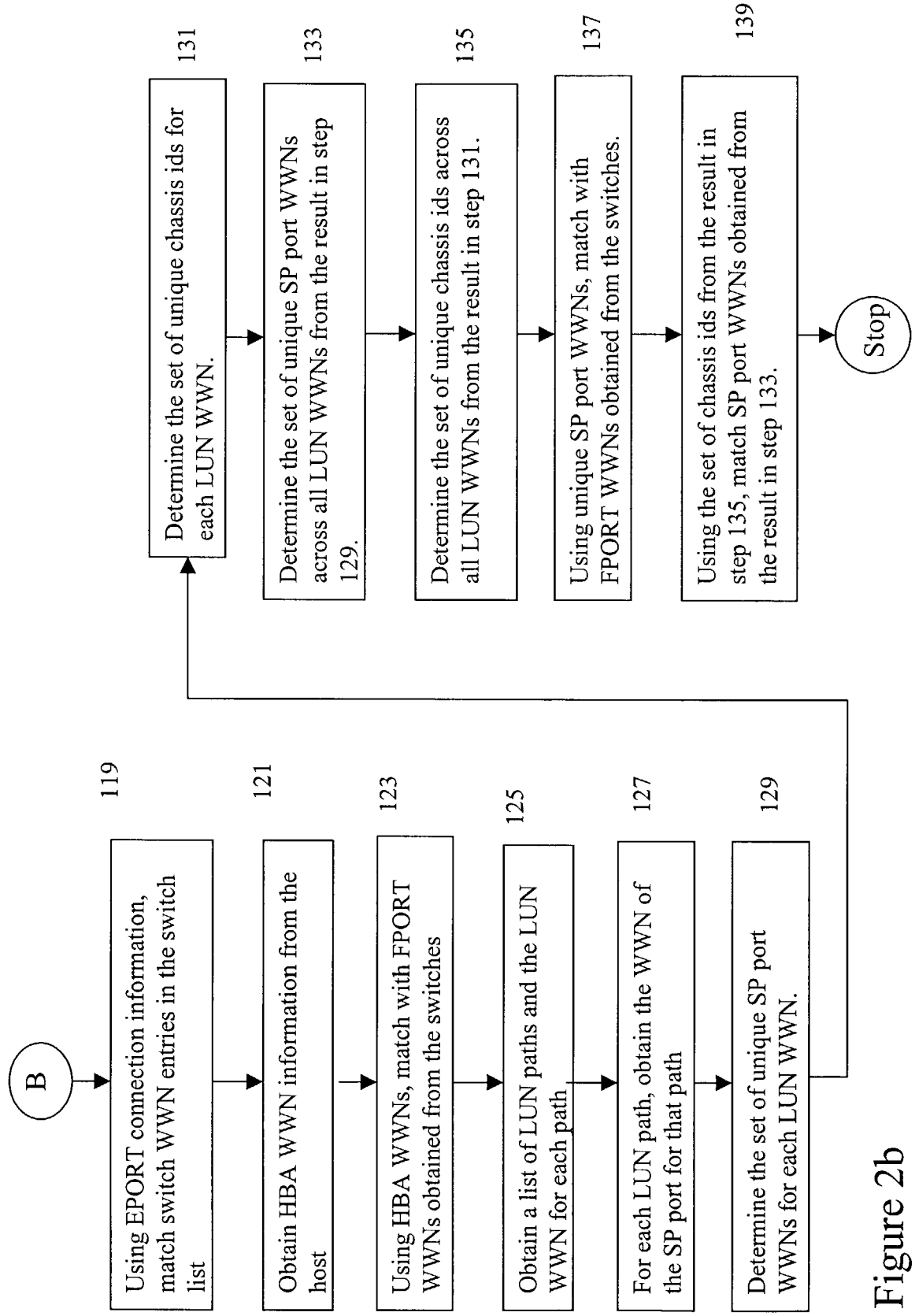

Referring to FIG. 2, a fabric mapping process according to an embodiment of the present invention is depicted. To begin the mapping process, a list of physical switch names and corresponding IP addresses is generated at 101. The IP address is the Internet address used to access the switch on a LAN. The generation of this list could be automated or implemented manually. The process queries, "is there at least one switch in the list generated" 103. If "no", the process proceeds to step 105 because there are no connections to map. If "yes", the process proceeds to step 107, wherein a switch is selected from the list of switches generated at 101 and the cataloging of port connections to this switch begins. After selecting a switch, the mapping process requests from the selected switch, a list of active FPORTs and the worldwide name ("WWN") of the port attached to the FPORT across the fabric 111. FPORT is a term defined in the Institute of Electrical and Electronics Engineers ("IEEE") Fibre Channel standards (such as the FC-PH standard) and is well understood by those of ordinary skill in the art. Next, the selected switch provides upon request a report of the WWNs for each of its physical ports 111 and for the switch's WWN 113. Further, the selected switch provides a report upon request of the port WWN of each active EPORT and the WWN of the switch attached to that EPORT at 115. An EPORT is a term defined in the IEEE Fibre Channel standards (such as the FC-FG standard) and is well understood by those of ordinary skill in the art. Said another way, EPORTs are the physical ports for fibre channel links that physically connect switches together to form the networked fabric.

At this point in the mapping process, the process determines whether or not there are additional switches to query 117. If so, steps 107-115 are repeated. This loop continues until all listed switches have been queried. If there are no more switches to query from the list generated at step 101, the process proceeds to step 119. At 119, using the EPORT port WWNs acquired in all instances of step 115, the process matches the port WWNs of the EPORTs with the switch WWNs to which they are attached. This provides the mapping for the links between physical switches and tells us how the switches in the fabric seen by the host are physically connected.

Once EPORT connections are mapped, the mapping process obtains the WWN of each Host Bus Adapter ("HBA") configured within the host 121. An HBA is an I/O adapter that sits between a host processor's bus and the Fibre Channel loop and manages the transfer of information between the two channels. The HBA WWNs are obtained by either querying the host operating system or the HBAs directly. At step 123, the WWNs obtained at 121 are compared to the list of WWNs attached to the list of active FPORTs obtained from all instances of step 109. This results in a mapping of the links between the host HBAs and the physical switches to which they are attached.

Next, the mapping process continues for the storage arrays linked into the fabric. In the physical embodiment wherein the storage arrays are connected to the fabric through storage processors ("SPs"), in order for the storage array to be part of the networked fabric, at least one of its fibre channel ports must be connected to a switch within the fabric. A SP is a component of the storage disk array that, among other operations, manages the storage disk array's access to the networked fabric through at least one of its fibre channel SP ports, allowing the SP to communicate with a host or hosts within the networked fabric. For purposes of this disclosure, ports on the storage arrays are hereafter referred to as SP ports. For example, referring to FIG. 1, storage processors ("SPs") 43, 45, 47, and 49 are connected to switches 27 and 29 through SP Ports 55, 57, 59, and 61.

In step 125, a list of all logical unit number ("LUN") paths seen by the host is generated and their LUN WWNs are obtained. A LUN path represents the host operating system construct used to manage communication from one HBA to one LUN. Because of MPIO (or multi-path IO technology) a single LUN can be visible to a host through more than one path. Each path involves one LUN through one SP port and one HBA that is allowed to see that LUN through that SP port within the fabric. For example, referring to the system of FIG. 1, Host 13 has four HBAs, 15a-15d connected to the fabric. From each HBA the host can see LUN 0 (44a) from, for example, SP 43 Port 0 (55). This creates four entries for LUN 0 (44a) within the host's operating system, all of which have the same LUN WWN. These four entries are grouped as paths to a single entry for LUN 0 (44a) based on the LUN WWN. In step 127, the mapping process determines the SP port WWN for each LUN path in the list obtained from step 125. Referring back to step 125, there are 4 entries for LUN 0 (44a) within the host operating system as seen from SP 43 Port 0 (55). After step 127, each entry for LUN 0 (44a) is now marked to show that it is connected to the WWN of SP 43 Port 0 (55). All other LUN paths within the fabric are marked in the same manner. In step 129, using the list of SP port WWNs from step 127 and the LUN WWNs from step 125, the mapping process determines the unique set of the SP Port WWNs for each LUN in the list obtained in step 125. This step removes duplicate LUN path entries in the list obtained in step 125 based on the SP port WWNs and LUN WWNs. For example, there are four entries for LUN 0 (44a) within the host operating system 13 as seen from SP 43 Port 0 (55). If there were another SP Port on the same storage array, SP 45 Port 0 (57), there would be four entries for the same LUN 0 (44a) within the host operating system 13 as seen from SP 45 Port 0 (57). After step 127, all four entries for LUN 0 (44a) from SP 43 Port 0 (55) have SP 43 port 0's port WWN associated with them. Further, all four entries for LUN 0 (44a) from SP 45 Port 0 (57) have SP 45 port 0's port WWN associated with them. Using the LUN WWN obtained in step 125 for this LUN 0 (44a) entry, it can be determined that all eight paths, in this example, are actually to the same LUN 0 (44a) through 2 SP ports, SP 43 Port 0 (55) and SP 45 Port 0 (57). This determination is completed for all LUNs.

Referring to step 131, for each LUN WWN from step 125, a unique chassis ID is determined using the list of unique SP port WWNs for that LUN WWN from step 129. A chassis ID is some unique identifier that identifies the entire storage array as a collective entity. All SP ports within a given storage array are defined as being in the same chassis and have the same chassis ID. This chassis ID could be a chassis serial number defined by the storage disk array itself or other unique value. Referring to the previous example, there are two unique SP port WWNs, SP 43 Port 0 (55) and SP 45 Port 0 (57), for LUN 0 (44a). Step 131 determines the unique chassis ID for LUN 0 (44a), in which these 2 SP Ports reside. This determination is completed for all LUNs. In step 133, using the list of unique SP port WWNs for each LUN WWN from step 129, the mapping process determines the unique set of SP port WWNs across all LUN WWNs seen by the host operating system. Referring again to the example, there are now two unique SP port WWNs and a unique chassis ID for LUN 0 (44*a*). There is also a list of unique SP port WWNs and unique chassis IDs for all other LUNs in that storage array. For example, LUN 1 (44*b*) on the same chassis would have the same unique SP port WWNs and chassis ID. Each LUN in other storage arrays would share the same unique SP Port WWNs and unique chassis ID for that array. Given the unique SP port WWNs list for each LUN WWN from step 129, the process determines the set of unique SP port WWNs across all LUN WWNs. Using the list of unique chassis IDs for each LUN WWN from step 131, the mapping process determines the unique set of chassis IDs across all LUN WWNs 135. Again, referring to the example, if there had only been the two LUNs, LUN 0 (44*a*) and LUN 1 (44*b*), and they both had the same two unique SP port WWNs with the same unique chassis ID, then the set of unique chassis IDs would be the one chassis. If there had been some LUN WWNs in another storage array, they would have a different set of unique SP port WWNs and a different unique chassis ID corresponding to that storage array. In step 137, using the list of unique SP port WWNs across all LUN WWNs from step 133, the process matches the SP port WWNs obtained in step 133 with the list of WWNs attached to the list of active FPORTs obtained from all instances of step 109. This provides the mapping for the links between the SP Ports and the physical switch or switches to which they are attached. Using the list of unique chassis IDs across all LUN WWNs from step 135, this list is matched with the unique set of SP port WWNs obtained in step 133. This is done by matching the LUN WWN used to determine both the unique SP port WWNs in step 133 and the unique Chassis IDs in step 135. Finally, referring to the example, since there exists at least one LUN WWN having two unique SP port WWNs and a unique chassis ID, we associate these two SP ports with the unique chassis ID 139.

With the mapping information generated through the steps of FIG. 2, the host 13 is capable of providing specific routing information instructions for accessing specific LUNs, i.e., 44*a*-44*f* and 46*a*-46*f*, located on separate storage arrays 39 and 41. Knowledge of the physical connections throughout the network fabric facilitates access, testing, maintenance, and optimization (e.g., load-balancing) of the network.

The methods described herein for mapping the network fabric for single host, may be extrapolated across multiple hosts. Although FIG. 1 only shows a single host 13, it is conceivable that one or more of the switches 27, 29 and/or the disk storage units 39, 41 may ultimately be connected to other hosts, either directly, or through additional components. Assuming these other components existed during the mapping process described above, WWNs for these additional components would be seen by host 13 in response to the queries to the switches 27, 29. Using the extrapolation steps described above with respect to a single host environment, the WWNs and LUNs can be used to determine the connections between other components and even between multiple hosts. As such, a designated host is able to map the network sub-fabric for itself and for other hosts that are connected to components of the designated host's network sub-fabric, in order to map the network fabric for a multiple host environment.

The embodiments described above are in no way intended to be limiting. One skilled in the art recognizes the many variations that are within the scope of the invention based on the information disclosed herein.

The invention claimed is:

1. A method for mapping the components and connections of a network fabric to build an in-memory picture of a fibre channel fabric, said network fabric having at least one host, comprising:

identifying the components of the network fabric with the at least one host, with each of the components including at least one input/output (I/O) port, and said identifying of the components including identifying an attribute which is a numerical identifier of the at least one I/O port of each of the components;

identifying with the at least one host, at least one starting port of the network fabric;

identifying with the at least one host, at least one ending port of the network fabric;

querying the components of the network fabric by the at least one host at identifiable starting points and ending points in the fabric, for obtaining information therefrom sufficient to determine the connections between the components of the network fabric, and said querying further comprising querying the components of the network by requesting information as to what each of the components of the network and the host see through each of their respective ports; and mapping with the at least one host, the components of the network fabric and all connections between the at least one starting point and the at least one ending point of the network fabric and identifying the connections between each of the components of the network fabric, with said connections between the components of the network fabric being identified according to a fibre identifier, wherein the fibre identifier is a function of the two ports that form each of the connections, and said mapping being done on the basis of said information through a series of comparisons, inferences and elimination steps to complete a table of components, the connections between the components and the hierarchical relationship between the components; and wherein the fibre network is mapped for a first host by a program implemented on one of the first host and a second host.

2. The method according to claim 1, wherein identification of the network components includes electronic and manual identification.

3. The method according to claim 1, wherein identification of the network components is through electronic identification.

4. The method according to claim 1, wherein at least part of the network components are connected via a local area network.

5. A method for mapping the components and connections of a network fabric to build an in-memory picture of a fibre channel fabric, said network fabric including at least one disk storage array, at least one switch, and at least one host, comprising:

identifying the components of the network fabric with the at least one host, said components comprising at least one disk storage array and at least one switch, each of the components including at least one input/output (I/O) port, and said identifying of the components including identifying an attribute which is a numerical identifier of the at least one I/O port of each of the components;

identifying with at least one host, at least one starting port of the network fabric at the host;

identifying with at least one host, at least one ending port of the network fabric at the at least one disk storage array;

identifying with at least one host, at least two middle ports of the network fabric at each of the at least one switch;

at the at least one host, recognizing the existence of multiple disks at the end of the network fabric;

querying with the at least one host at identifiable staffing points and ending points in the fabric, the at least one disk storage array, at least one switch, the at least one host, and the multiple disks of the network fabric for obtaining information therefrom sufficient to determine the connections therebetween, and said querying further comprising querying the at least one disk storage array, at least one switch, and the at least one host, by requesting information as to what the at least one disk storage array, at least one switch, and the at least one host see through each of their respective ports;

mapping with the at least one host, the at least one disk storage array, the at least one switch, the at least one host, and the multiple disks of the network fabric and all connections therebetween, with said connections being identified according to a fibre identifier, wherein the fibre identifier is a function of the two ports that form each of the connections, and said mapping being done on the basis of said information through a series of comparisons, inferences and elimination steps to complete a table of components, the connections between the components and the hierarchical relationship between the components; and said mapping being done for a first host by a program implemented on one of the first host and a second host.

6. A method for mapping the components and connections of a network fabric to build an in-memory picture of a fibre channel fabric, said network fabric having at least one host and switches, comprising:

identifying the components of the network fabric with the at least on host, said components comprising at least one host and a plurality of switches, and with each of the components including at least one input/output (I/O) port, and said identifying of the components including identifying an attribute which is a numerical identifier of the at least one I/O port of each of the components;

generating a list of switch names at the at least one host for the plurality of switches on the fabric, including the corresponding network address for each switch name;

querying with the at least one host at identifiable starting points in the fabric, the network fabric using the corresponding network address for each switch name for obtaining information therefrom for determining the existence of the plurality of switches from the list of switch names;

selecting with the at least one host, a first switch from the plurality of switches;

at the at least one host, requesting from the first switch, a list of first ports and an identifying number associated with each of the first ports;

with the at least on host, requesting from the first switch an identifying number for the first switch, for each of a list of second ports, and for each of a list of third ports;

said querying by the at least one host further comprising querying the switches of the fabric by requesting information as to what each of the switches of the fabric see through each of their respective ports;

mapping with the at least one host, the components of the network fabric, including the plurality of switches, and all connections between at least one starting point and at least one ending point of the network fabric and identifying the connections between each of the switches of the network fabric, with said connections between switches being identified according to fiber identifiers wherein the fiber identifier is a function of two ports that form each of the connections, and said mapping being done on the basis of said information through a series of comparisons, inferences and elimination steps to complete a table of components, including switches, the connections between the components, and the hierarchical relationship between the components; and said mapping being done for a first host by a program implemented on one of the first host and a second host.

7. The method according to claim 6, further comprising:

querying a host that is attached to the at least one switch for the identifying number of at least one adaptors located on the host; and comparing the identifying number of the at least one adaptors to the identifying numbers associated with each of the first ports.

8. The method according to claim 7, further comprising:

generating a list of fabric paths seen by the host; and obtaining an identifying number for each of the fabric paths.

9. The method according to claim 8, further comprising:

determining a list of fourth ports associated with each fabric path and obtaining an identifying number for each of the fourth ports, wherein multiple fourth ports may be associated with a single fabric path; and comparing the fabric path identifying numbers with the fourth port identifying numbers and grouping like identifying numbers.

10. The method according to claim 9, further comprising:

determining a unique identifier for each fabric path, wherein the unique identifier represents one or more fourth ports associated with a single fabric path, and further wherein identical unique identifiers map to a single disk array.

11. The method according to claim 10, further comprising:

matching the identifying numbers for the fourth ports with identifying numbers associated with the first ports, thereby linking at least one of the fourth ports with the first switch.

12. A method for mapping the components and connections of a network fabric to build an in-memory picture of a fibre channel fabric, wherein the network fabric includes at least one disk storage array, at least one switch, and at least one host, comprising:

identifying the components of the network fabric with the at least one host, said components comprising at least one disk storage array and at least one switch, and said components including at least one input/output (I/O) port, and said identifying of the components including identifying an attribute which is a numerical identifier of the at least one I/O port of each of the components;

identifying with the at least one host, at least one starting port of the network fabric at the at least one host;

identifying with the at least one host, at least one ending port of the network fabric at the at least one disk storage array;

identifying with the at least one host, at least two middle ports of the network fabric at each of the at least one switch;
recognizing at the least one host, the existence of multiple disks at the end of the network fabric;
querying through the at least one host at identifiable starting points and ending points in the fabric, the at least one disk storage array, at least one switch, the at least one host and the multiple disks of the network fabric for obtaining information thereform sufficient to determine the connections therebetween, wherein the querying of the multiple disks includes requesting the logical unit worldwide name for each of the multiple disks, and said querying further comprising querying the at least one disk storage array, at least one switch, the host and the multiple disks of the network fabric by requesting information as to what the at least one disk storage army, at least one switch, the at least one host and the multiple disks of the network fabric see through each of their respective ports;

mapping with the at least one host, the components of the network fabric, including said at least one storage array and said at least one switch, and all connections between an at least one starting point and at least one ending point of the network fabric and identifying the connections. between the components of the network fabric being indentified according to a fibre identifier, wherein the fibre identifier is a function of two ports that form each of the connections, and said mapping being done on the basis of said information through a series of comparisons, inferences and elimination steps to complete a table of components, the connections between the components and the hierarchical relationship between the components; and said mapping being done for a first host by a program implemented on one of the first host and a second host.

\* \* \* \* \*